United States Patent [19]

Engström

[11] Patent Number: 5,632,901
[45] Date of Patent: May 27, 1997

[54] PROCESS FOR THE ELIMINATION OF HEAVY METALS

[75] Inventor: Bengt T. Engström, Vallåkra, Sweden

[73] Assignee: Kemira Kemi Aktiebolag, Helsingborg, Sweden

[21] Appl. No.: 389,407

[22] Filed: Feb. 16, 1995

[30] Foreign Application Priority Data

Feb. 21, 1994 [SE] Sweden .................... 9400585

[51] Int. Cl.[6] .................... C02F 1/52; C02F 1/62
[52] U.S. Cl. .................... 210/724; 210/727; 210/912; 210/928
[58] Field of Search .................... 210/724, 727, 210/928, 912

[56] References Cited

U.S. PATENT DOCUMENTS

| 3,873,418 | 3/1975 | Brax | 210/928 |
| 4,921,613 | 5/1990 | Nordberg et al. | 210/928 |
| 5,368,693 | 11/1994 | Vikio | 210/928 |
| 5,435,921 | 7/1995 | Collins et al. | 210/928 |

FOREIGN PATENT DOCUMENTS

| 58002 | 5/1978 | Japan | 210/928 |

*Primary Examiner*—Neil McCarthy
*Attorney, Agent, or Firm*—Brumbaugh, Graves, Donohue & Raymond

[57] ABSTRACT

The present invention relates to a process for the elimination of heavy metals from a closed white water system within the pulp and paper industry, wherein one adjusts the pH of the white water to between 5 and 11, and that one subsequently precipitates the resins present using a flocculation agent, whereby by a simultaneous elimination of the heavy metals is obtained.

6 Claims, No Drawings

PROCESS FOR THE ELIMINATION OF HEAVY METALS

TECHNICAL FIELD

The present invention relates to the elimination of heavy metals from white water in the pulp and paper industry.

The object of the present invention is to obtain a possibility to eliminate heavy metals from a closed white water system within the pulp and paper industry.

BACKGROUND OF THE INVENTION

Today, within the pulp and paper industry, there is a more frequent closing of the white water systems. This is, as such, a positive environmental factor, by reducing the discharge to different recipients, but means increased problems, as well, within the industry by accumulation of different compounds in the white water systems as closed. Thus there is an accumulation of resins and heavy metals in the white water, which different compounds have to be eliminated in order not to create problems at the production of paper and pulp at the renewed use of the white water. Resins and heavy metals are present in different concentrations in the wooden raw materials depending on its origin.

The resins can be precipitated chemically by using flocculation agents followed by flotation or sedimentation whereby the white water as such can be treated using such a flocculating agent.

One has, however, not known how to treat the heavy metals.

DESCRIPTION OF THE PRESENT INVENTION

It has now surprisingly turned out possible to be able to eliminate the heavy metals from the white water in accordance with the present invention which is characterized in that one adjusts the pH of the white water to between 5 and 11, and that one subsequently precipitates the resins present using a flocculation agent whereby, simultaneously, an elimination of the heavy metals is carried out.

By means of the present invention it is achieved that 60 to 90% of the heavy metals present are eliminated.

The process is preferably carried out at a pH of between 6.5 and 11, more preferably between 7 and 9.5. Thus it has turned out that an optimal reduction of the Mn-level is obtained at pH 8, while optimal reduction of Fe is obtained at a somewhat higher pH.

The white water contains a large amount of heavy metals and other metals, such as W, Cr, Cd, Pb, Bi, Co, Se, Hg, Ni, Zn, Ti, Cu, Mn, Mo, Sr, Fe, As, V, Al, S, Mg and Ca. The latter two should, desirably, not be eliminated.

For the precipitation of the resins a synthetic coagulant is used as flocculation agent, such as polyimine, polyimide, polyacrylic amide, polyethylene oxide, phenolic resins, or combinations thereof.

By means of the present invention there is no need for addition of a coagulant, such as aluminium sulphate, aluminium chloride, polyalumnium sulphates, polyaluminium chlorides, or the similar to the white water, but an effective precipitation of the resins and the heavy metals are obtained by using a flocculant only.

The present process is preferably carried out at the pulp manufacturing site, whereby the necessity for carrying out the process in a subsequent paper production stage is more or less eliminated. The pulp will be freed of the heavy metals in the pulp manufacturing stage.

The invention will be described in the following with reference to an operation with white water from a pulp industry, the pH of the white water being adjusted to pH 7, whereupon polyethylene oxide was added in such an amount as to provide flocculation of the resins present.

TABLE 1

| Heavy metal | % elimination |
|---|---|
| W | 89 |
| Cr | 87 |
| Cd | 90 |
| Pb | 90 |
| Bi | 90 |
| Co | 90 |
| Se | 78 |
| Hg | 83 |
| Ni | 94 |
| Zn | 86 |
| Ti | 99 |
| Cu | 69 |
| Mn | 76 |
| Mo | 58 |
| Sr | 58 |
| Fe | 63 |
| As | 18 |
| V | 16 |
| Al | 38 |
| S | 27 |
| Mg | 26 |
| Ca | 16 |

As evident from the above table a considerable elimination of the heavy metals was obtained.

Trials to precipitate the heavy metals without a simultaneous precipitation of the resins showed that no elimination of the heavy metals was obtained.

I claim:

1. A process for elimination of resins and heavy metals from white water comprising adjusting the pH of white water to between greater than 7 and 11, and subsequently adding a flocculation agent, thereby causing simultaneous precipitation of resins and heavy metals.

2. A process according to claim 1, wherein the pH is adjusted to between greater than 7 and 9.5.

3. A process according to claim 2, wherein the pH is adjusted to between greater than 7 and 8.5.

4. A process according to claim 1, wherein the pH is adjusted to between 8 and 11.

5. A process according to claim 1, wherein the pH is adjusted to about 8.

6. A process according to claim 1, wherein the pH is adjusted to less than 10.

* * * * *